United States Patent Office 2,709,112
Patented May 24, 1955

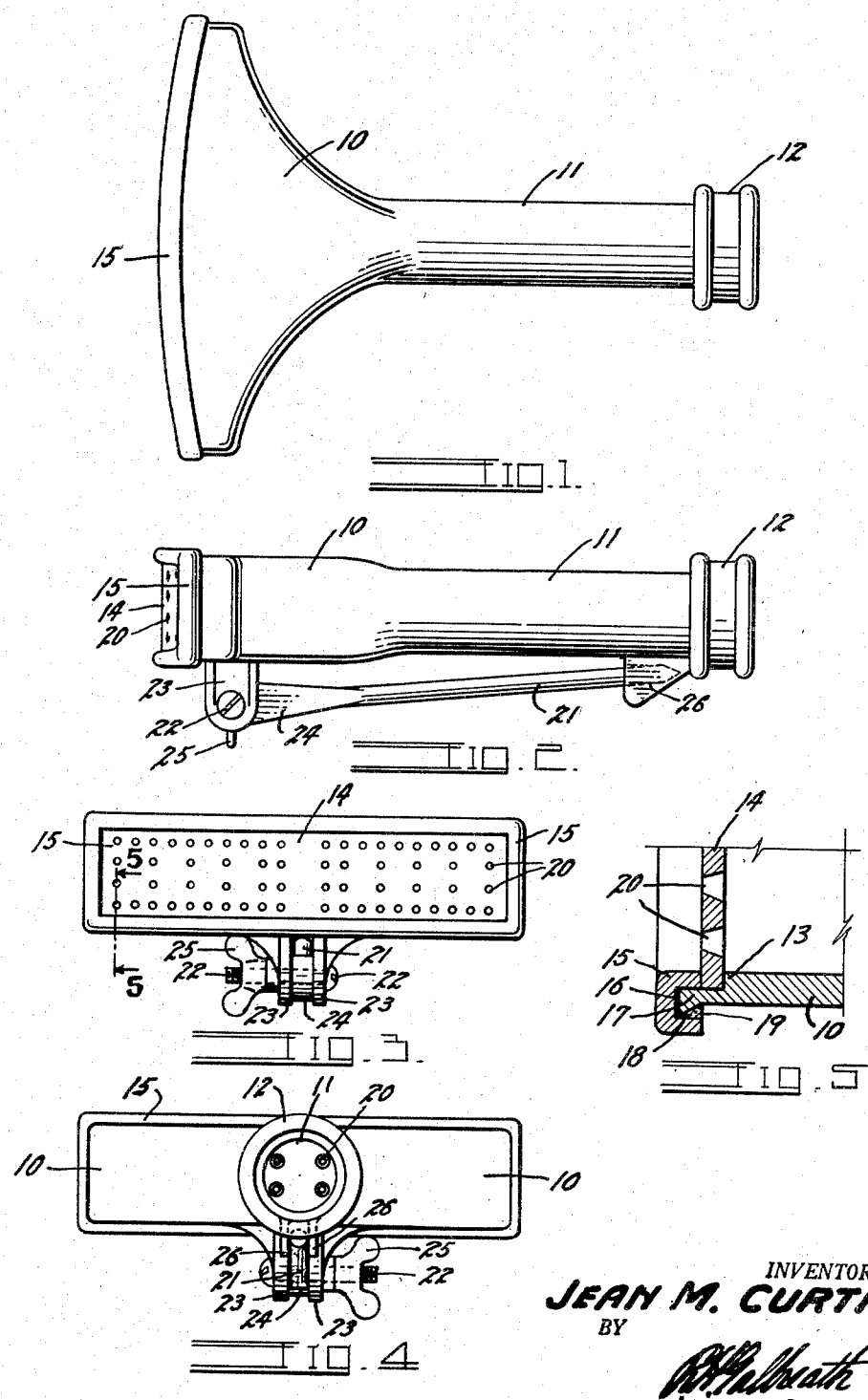

2,709,112

LAWN SPRINKLING NOZZLES

Jean M. Curtice, Denver, Colo., assignor to Curtice Manufacturing Co., Inc., Denver, Colo., a corporation of Colorado Application December 8, 1952, Serial No. 324,690

2 Claims. (Cl. 299—141)

This invention relates to a lawn sprinkling nozzle, and has for its principal object the provision of a nozzle which will produce a flat, fan-shaped spray of uniform water content throughout its entire width and which can be conveniently used as either a hand or set nozzle.

Another object of the invention is to provide a rugged and substantial, leak-proof nozzle that can be economically manufactured.

A further object is to provide a nozzle of the perforated type which can be quickly and easily back-washed to remove any foreign particles from the perforations, and which will not catch or tangle with obstructions when drawn over the lawn.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved lawn sprinkling nozzle;

Fig. 2 is a side view thereof;

Fig. 3 is a front view;

Fig. 4 is a rear view; and

Fig. 5 is an enlarged, detail section, taken on the line 5—5, Fig. 3.

The improved nozzle comprises a flat, funnel-shaped body 10 having an enlarged forward extremity and terminating at its rear in an intake tube 11. The rear extremity of the intake tube is provided with an enlarged, internally threaded, integrally molded socket 12 for receiving the threaded terminal coupling of a hose. The forward flared extremity of the body 10 is provided with an indented, peripheral shoulder 13 against which an elongated, curvated aperture plate 14 rests.

The aperture plate 14 is held against the shoulder 13 by means of a retaining bezel 15 having a receiving groove 16, extending throughout the medial portion of its rear face, for receiving a projecting peripheral edge 17 on the forward extremity of the body 10. The forward face of the edge 17 is wider than the inner portion thereof so as to produce a wedge-shaped locking projection 18 completely around the edge 17.

When assembled, the plate 14 rests against the shoulder 13, and the inner edge of the bezel 15 rests against the plate 14. The outer edge of the bezel extends rearwardly beyond the inclined locking projection 18 to form a peripheral recess of triangular cross-section, which is filled with any suitable cementing material 19, such as liquid air-setting plastic or the like. The cementing material forms a triangular sealing wedge or bond between the inner edge of the groove 16 and the inclined surface of the inclined projection 18, which positively and permanently prevents water pressure from forcing the plate 14 outwardly.

The triangular shape of the embedded cement causes the water pressure to exert a wedging action against the inclined projection 18 to tightly force the bead member against the plate 14, and the latter against the shoulder 13 to form a tight, leakproof joint entirely around the forward periphery of the body 10.

The plate 14 is perforated with a plurality of relatively small, tapered spray perforations 20 arranged in a predetermined pattern. It will be noted that the spray perforations are formed to outline two rectangles so as to form two adjacent, enclosed, hollow water sprays. The interiors of the hollow sprays are filled by jets from additional perforations 20 placed within the outlines of the border perforations, as shown in Fig. 3, with a concentration of perforations at the medial portion of the nozzle. This particular pattern was developed, after long experiment, to produce a soft, wide, uniformly dispersed water spray.

As thus far described, the nozzle forms an ideal hand nozzle for lawn and garden watering. The sharp alignment of the spray allows the user to water closely into corners and along the edges of sidewalks and curbs without water waste.

For use as a set sprinkler, the nozzle is provided with a supporting pin 21 having a sharpened extremity for insertion into the lawn. The nozzle is hinged to the upper and forward extremity of the pin 21 upon a hinge bolt 22 which passes through two downwardly projecting bracket members 23 formed on the bottom of the medial portion of the body 10. The upper extremity of the pin 21 is flattened, as indicated at 24, to pass between the bracket members 23, where it may be locked by means of a winged clamping nut 25 in any desired position to support the nozzle at the desired angle.

When not in use, the pointed extremity of the pin 21 is swung upwardly between two spaced-apart protecting ears 26 formed on and projecting from the inlet tube 11 adjacent the socket 12. The protecting ears 26 prevent the point of the pin 21 from hooking on and engaging fixed objects when the hose is drawn upon.

It is desired to call attention to the fact that the perforations 20 are of less diameter at the front of the plate 14 than at the rear thereof. This serves a double function: first, it forms a compact, high-velocity jet of water from each perforation; and second, should foreign material be trapped in the perforations of the plate 14, it is only necessary to place the open extremity of the hose on the front of the plate and direct water rearwardly therethrough to completely wash the caught material from the tapered perforations.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A hose nozzle comprising: a flattened, flaring body extending to an apex at the middle rear portion; an integrally formed, inlet tube extending from said apex; means on the rear extremity of said tube for attaching a hose thereto, the forward flattened extremity of said body being arcuately curved in a horizontal plane; a shoulder formed about the interior of said forward extremity; a perforated plate inset in said forward extremity against said internal shoulder; and a grooved retaining bezel corresponding in contour to said forward extremity fitting over the peripheral edge of the latter and bearing against said perforated plate to retain the latter against said shoulder.

2. A hose nozzle comprising: a flattened, flaring body extending to an apex at the middle rear portion; an integrally formed, inlet tube extending from said apex; means on the rear extremity of said tube for attaching a hose thereto, the forward flattened extremity of said body being arcuately curved in a horizontal plane; a shoulder formed about the interior of said forward extremity; a perforated plate inset in said forward extremity against said internal shoulder; a grooved retaining bezel corresponding in contour to said forward extremity fitting over the peripheral edge of the latter and bearing against said perforated plate to retain the latter against said shoulder; an outwardly extending, wedge-shaped projection formed on and peripherally surrounding said forward extremity, said bezel extending rearwardly about said projection; and means positioned between said projection and said bezel for holding the latter in place on said extremity.

References Cited in the file of this patent

UNITED STATES PATENTS

| | | |
|---|---|---|
| 666,580 | Van Sickle | Jan. 22, 1901 |
| 994,005 | Jones | May 30, 1911 |
| 2,003,052 | Lord | May 28, 1935 |
| 2,125,445 | Holveck | Aug. 2, 1938 |
| 2,249,274 | Faine | July 15, 1941 |
| 2,254,751 | Paradise | Sept. 2, 1941 |
| 2,552,352 | Swanson | May 8, 1951 |